United States Patent
Royse

(10) Patent No.: US 7,293,576 B2
(45) Date of Patent: Nov. 13, 2007

(54) SINGLE-PIECE MANIFOLD WITH REDUCED PRESSURE ARRANGEMENT

(75) Inventor: David L. Royse, Wildwood, MO (US)

(73) Assignee: Potter Electric Signal Company, St. Louis, MO (US)

( * ) Notice: Subject to any disclaimer, the term of this patent is extended or adjusted under 35 U.S.C. 154(b) by 239 days.

(21) Appl. No.: 11/091,236

(22) Filed: Mar. 28, 2005

(65) Prior Publication Data

US 2006/0213556 A1    Sep. 28, 2006

(51) Int. Cl.
E03C 1/10 (2006.01)

(52) U.S. Cl. ...................... 137/218; 137/512

(58) Field of Classification Search ............... 137/218, 137/512, 115.15
See application file for complete search history.

(56) References Cited

U.S. PATENT DOCUMENTS

| | | | | |
|---|---|---|---|---|
| 3,173,439 A | * | 3/1965 | Griswold et al. | 137/107 |
| 3,724,487 A | * | 4/1973 | Hunter | 137/218 |
| 4,090,527 A | * | 5/1978 | Sutherland | 137/215 |
| 4,217,921 A | | 8/1980 | Gidner | |
| 4,276,897 A | * | 7/1981 | Griswold | 137/218 |
| 4,849,739 A | | 7/1989 | Loiacono | |
| 4,878,515 A | * | 11/1989 | Stevens | 137/218 |
| 4,895,180 A | * | 1/1990 | Vollmer | 137/115.06 |
| 4,945,940 A | * | 8/1990 | Stevens | 137/218 |
| 5,363,875 A | * | 11/1994 | Vollmer | 137/218 |
| 5,425,393 A | | 6/1995 | Everett | |
| 5,469,879 A | | 11/1995 | Rasmussen | |
| 5,522,796 A | | 6/1996 | Dorsey, III | |
| 5,669,405 A | * | 9/1997 | Engelmann | 137/115.07 |
| 6,102,066 A | | 8/2000 | Craig et al. | |
| 6,138,706 A | | 10/2000 | Brint | |
| 6,206,025 B1 | | 3/2001 | Koch et al. | |
| 6,443,173 B1 | | 9/2002 | Thompson, Jr. | |
| 6,446,652 B1 | * | 9/2002 | Horne et al. | 137/15.18 |
| 6,540,028 B2 | | 4/2003 | Wood | |
| 6,540,205 B1 | | 4/2003 | Stafford | |
| 6,824,118 B1 | | 11/2004 | Stafford | |
| 6,860,331 B2 | | 3/2005 | Hagen et al. | |
| 2002/0108759 A1 | * | 8/2002 | Hagen et al. | 169/23 |
| 2002/0121302 A1 | | 9/2002 | Thompson, Jr. | |

* cited by examiner

*Primary Examiner*—Gregory Huson
*Assistant Examiner*—Craig M. Schneider
(74) *Attorney, Agent, or Firm*—Lewis, Rice & Fingersh, L.C.

(57) ABSTRACT

A single-piece manifold comprising a body having an inlet in communication with a water supply and an outlet that communicates with a sprinkler system having a main conduit adapted for fluid flow between the inlet and the outlet is disclosed. The body includes a main valve that provides a means of manually shutting off communication with the water supply and first and second check valves positioned across the main conduit for preventing fluid flow therethrough until the sprinkler system is activated. The single-piece manifold has a reduced pressure arrangement comprising a valve member that vents water that may build up between the first and second check valves in order to prevent the back flow of contaminated water from the sprinkler system to the water supply.

6 Claims, 7 Drawing Sheets

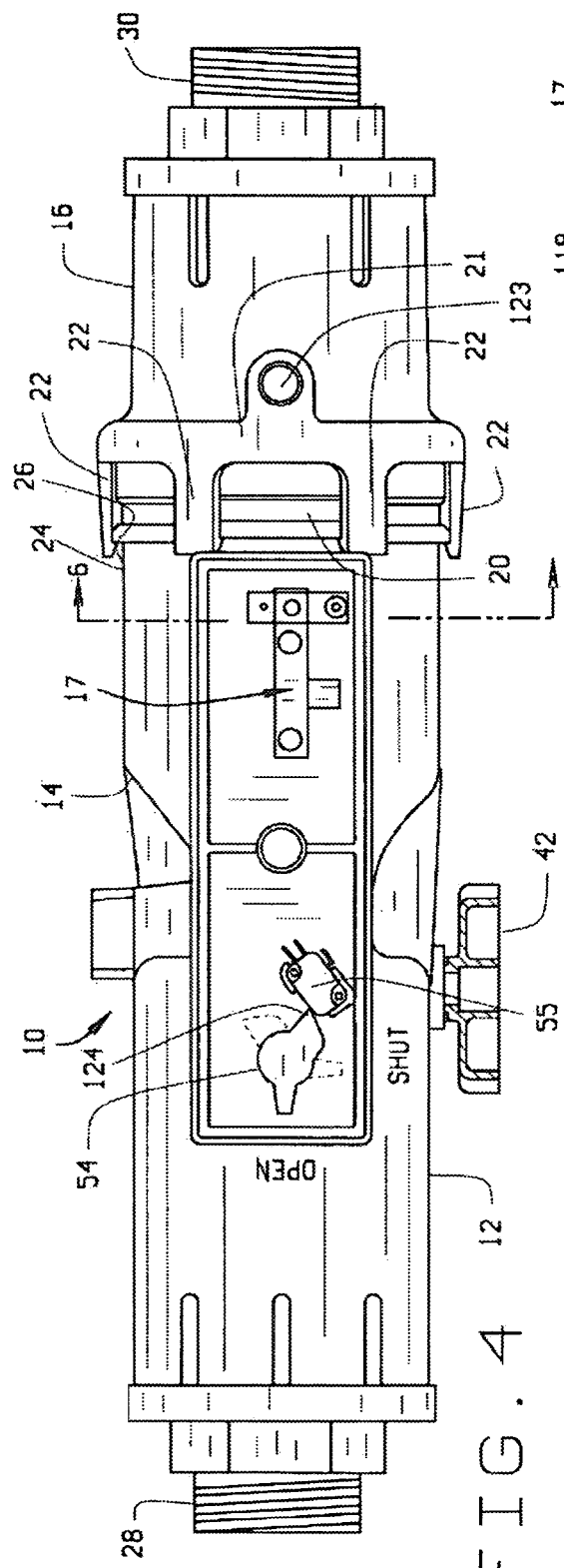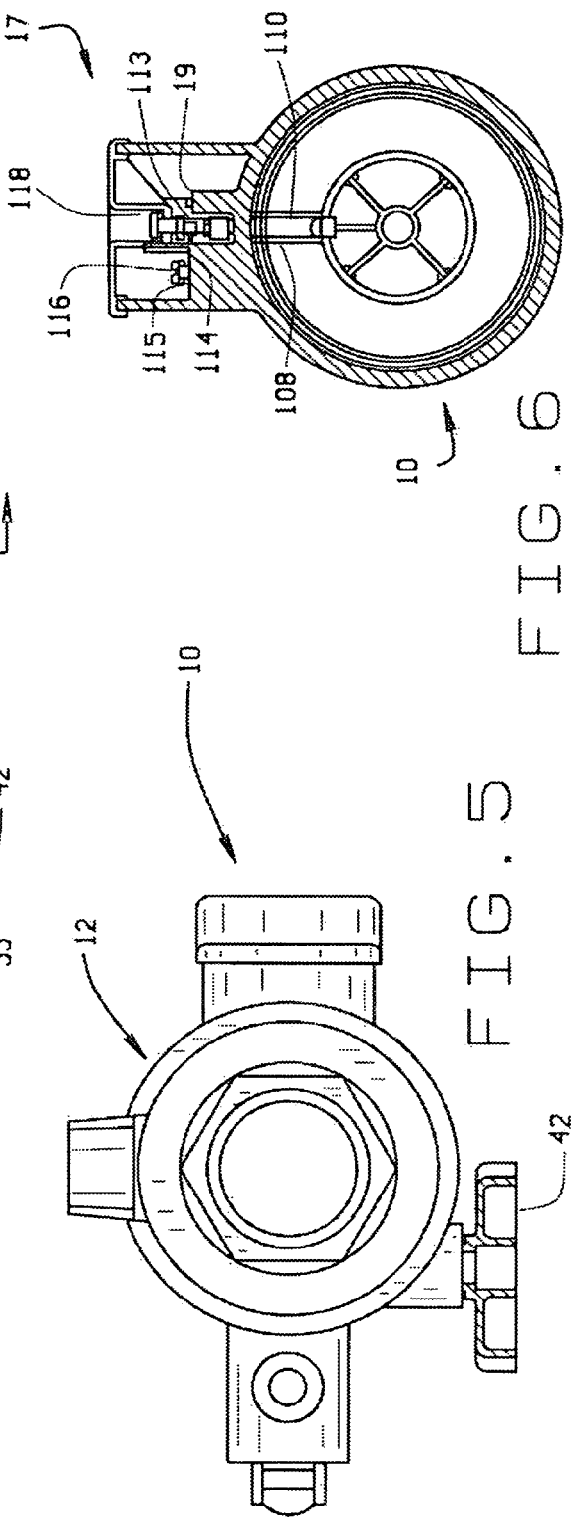

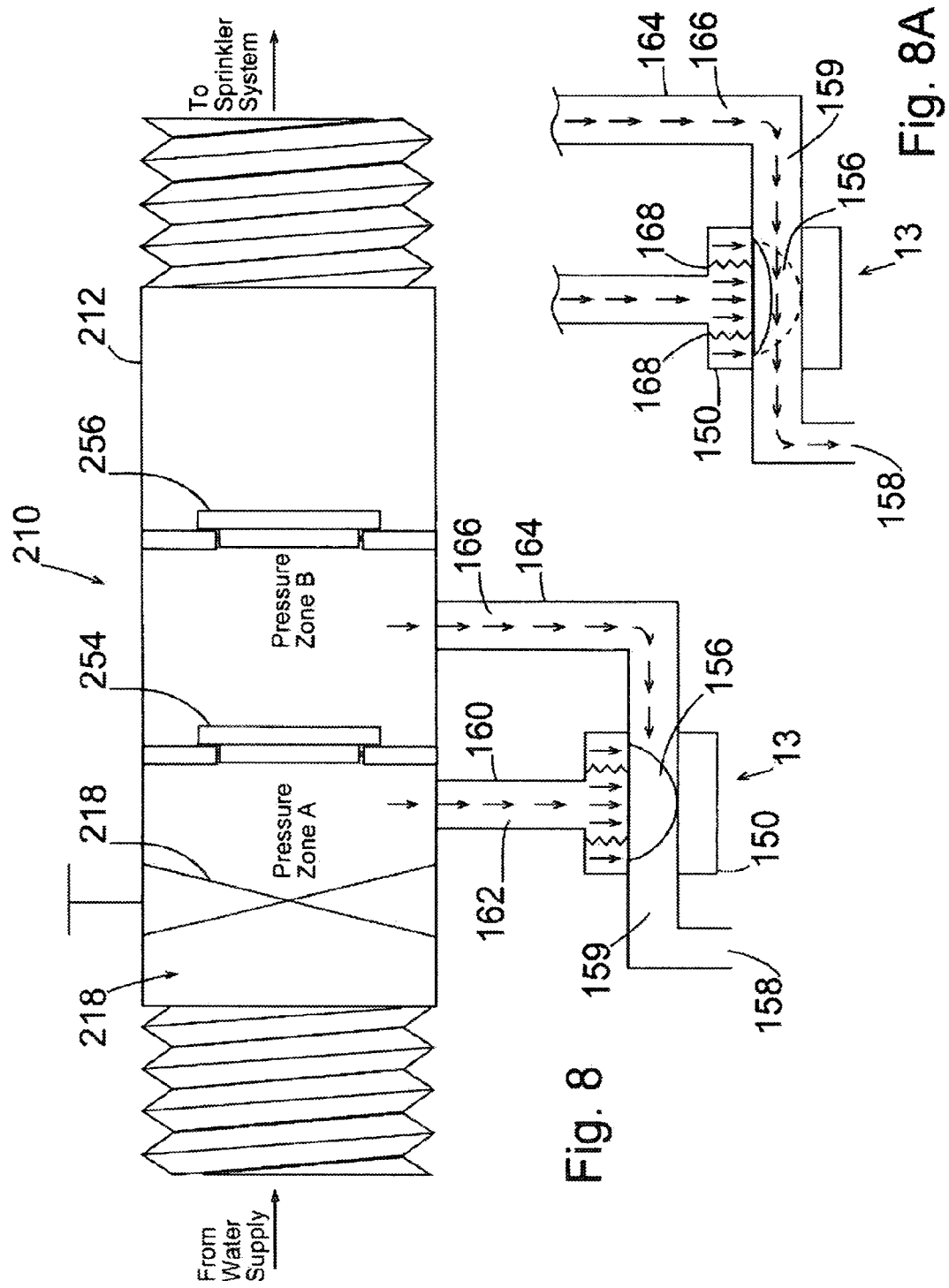

SINGLE-PIECE MANIFOLD WITH REDUCED PRESSURE ARRANGEMENT

BACKGROUND OF THE INVENTION

1. Field of the Invention

The present invention relates to sprinkler systems, and more particularly to a single-piece manifold for a sprinkler system.

2. Prior Art

Many public and residential buildings are now being built with sprinkler systems for suppressing fires and initiating a fire alarm. As shown in FIG. 1, sprinkler systems commonly include a prior art multi-piece manifold assembly connected to a water supply for providing a potential source of water for use by a sprinkler system in the event of a fire. A typical multi-piece manifold assembly of the prior art comprises a check valve arrangement 1 having first and second check valves for preventing fluid flow from the water supply through the multi-piece manifold assembly until activation of the sprinkler system as well as prevent the back flow of water from the sprinkler system to the water supply after activation has occurred. The multi-piece manifold assembly further comprises a flow switch 2 for indicating fluid flow through the manifold assembly when the sprinkler system is activated, a pressure relief valve 3 for relieving an excess pressure condition inside the manifold assembly, and a test and drain valve 4 which permits the user to test the entire system for system pressure and drain the system for maintenance.

As further shown, the multi-piece manifold assembly includes a network of parts requiring multiple connections which can be difficult and time consuming to assemble. One drawback of the multi-piece manifold assembly of the prior art is that the multiple connection of parts can lead to the possibility that leaks may develop at various connection points along the manifold assembly. In addition, pressure surges in the water supply line may also cause the check valve arrangement 1 to move which can inadvertently sound an alarm falsely indicating that fluid flow has been initiated through the multi-piece manifold assembly. Finally, degradation of the sealing elements of the second check valve in communication with the sprinkler system can cause liquid from an activated sprinkler system to build up in the space defined between the first and second check valves which may cause the back flow of contaminated water from the sprinkler system to enter the water supply if a sufficient pressure head was generated to overcome the first check valve.

Therefore, there is a need in the art for a single-piece manifold of unitary construction that prevents the sounding of a false alarm due to the pressure surges in the sprinkler system. There is a further need in the art for a single-piece manifold having a detection mechanism for detecting the initiation of fluid flow through the manifold. Finally, there is a need in the art for a single-piece manifold that prevents the back flow of water from the sprinkler system back into the water supply.

OBJECTS AND SUMMARY OF THE INVENTION

A primary object of the present invention is to provide a single-piece manifold of unitary construction for use in a sprinkler system and other water delivery systems.

Another object of the present invention is to provide a single-piece manifold which may be easily assembled and connected between a water supply and a sprinkler system.

A further object of the present invention is to provide a single-piece manifold that activates an alarm when fluid flow is initiated through the manifold.

Another further object of the present invention is to provide a single-piece manifold that incorporates the functions of a multi-piece manifold assembly.

Yet another object of the present invention is to provide a single-piece manifold which will not sound a false alarm when a pressure surge occurs within the water supply.

Another further object of the present invention is to provide a single-piece manifold that prevents the back flow of water from the sprinkler system into the water supply.

Another object of the present invention is to provide a single-piece manifold having a reduced pressure arrangement that vents any built-up water from the single-piece manifold in order to prevent the back flow of water from the sprinkler system to the water supply.

Yet another further object of the present invention is to provide a single-piece manifold having a normally closed valve member that is placed in an open position when the difference in pressure between one pressure zone of the manifold exceeds a predetermined threshold relative to another pressure zone of the manifold.

In one embodiment, the present invention comprises a single-piece manifold for a fire sprinkler system comprising a body defining a main conduit therethrough in communication with an inlet for connecting the single-piece manifold to a supply of water and an outlet for connecting the single-piece manifold to the fire sprinkler system, a main valve in the main conduit movable between an open position in which water may enter the body and a closed position in which water is prevented from passing through the body, a first check valve and a second check valve within the main conduit for preventing or permitting fluid flow communication through the main conduit, a first pressure zone defined between the inlet and the first check valve and a second pressure zone defined between said first check valve and the second check valve, and a valve member in communication with the first pressure zone and the second pressure zone for preventing water from the second pressure zone from flowing back into the first pressure zone.

In another embodiment, the present invention comprises a single-piece manifold comprising a body defining a main conduit therethrough in communication with an inlet for connecting the single-piece manifold to a supply of water and an outlet for connecting the single-piece manifold to a sprinkler system, the body having a first pressure zone having a first pressure and a second pressure zone having a second pressure, and a valve member in communication with the first pressure zone and the second pressure zone, the valve member being operable between a normally closed position to prevent fluid flow and an open position that permits fluid flow.

In yet another embodiment, the present invention comprises a single-piece manifold comprising, a body defining a main conduit therethrough in communication with an inlet for connecting the single-piece manifold to a supply to water and an outlet for connecting the single-piece manifold to a sprinkler system, a first check valve and a second check valve within the main conduit for preventing or permitting fluid flow communication through the main conduit, a first pressure zone defined between the inlet and the first check valve and a second pressure zone defined between the first check valve and the second check valve; a valve member in communication with the first pressure zone and the second pressure zone for preventing water from the second pressure zone from flowing back into the first pressure zone, and a vent passageway in communication with the main conduit for preventing water from flowing through the main conduit when there is a pressure surge in the supply of water.

Additional objects, advantages and novel features of the invention will be set forth in the description which follows, and will become apparent to those skilled in the art upon examination of the following more detailed description and drawings in which like elements of the invention are similarly numbered throughout.

BRIEF DESCRIPTION OF THE DRAWINGS

FIG. 4 is a top plan view of the single-piece manifold with a cover removed to show a flow switch arrangement according to the present invention;

FIG. 5 is a front view of the single-piece manifold taken along line 5-5 of FIG. 4 according to the present invention;

FIG. 6 is a cross sectional view of the single-piece manifold taken along line 6-6 of FIG. 3 showing one aspect of the second check valve according to the present invention;

FIG. 8 is a simplified cross-sectional illustration of the preferred embodiment of the single-piece manifold showing the reduced pressure arrangement according to the present invention; and FIG. 8a is an enlarged simplified cross-sectional illustration of the reduced pressure arrangement showing the open and closed positions of the diaphragm according to the present invention.

DETAILED DESCRIPTION OF THE INVENTION

Figure 1:
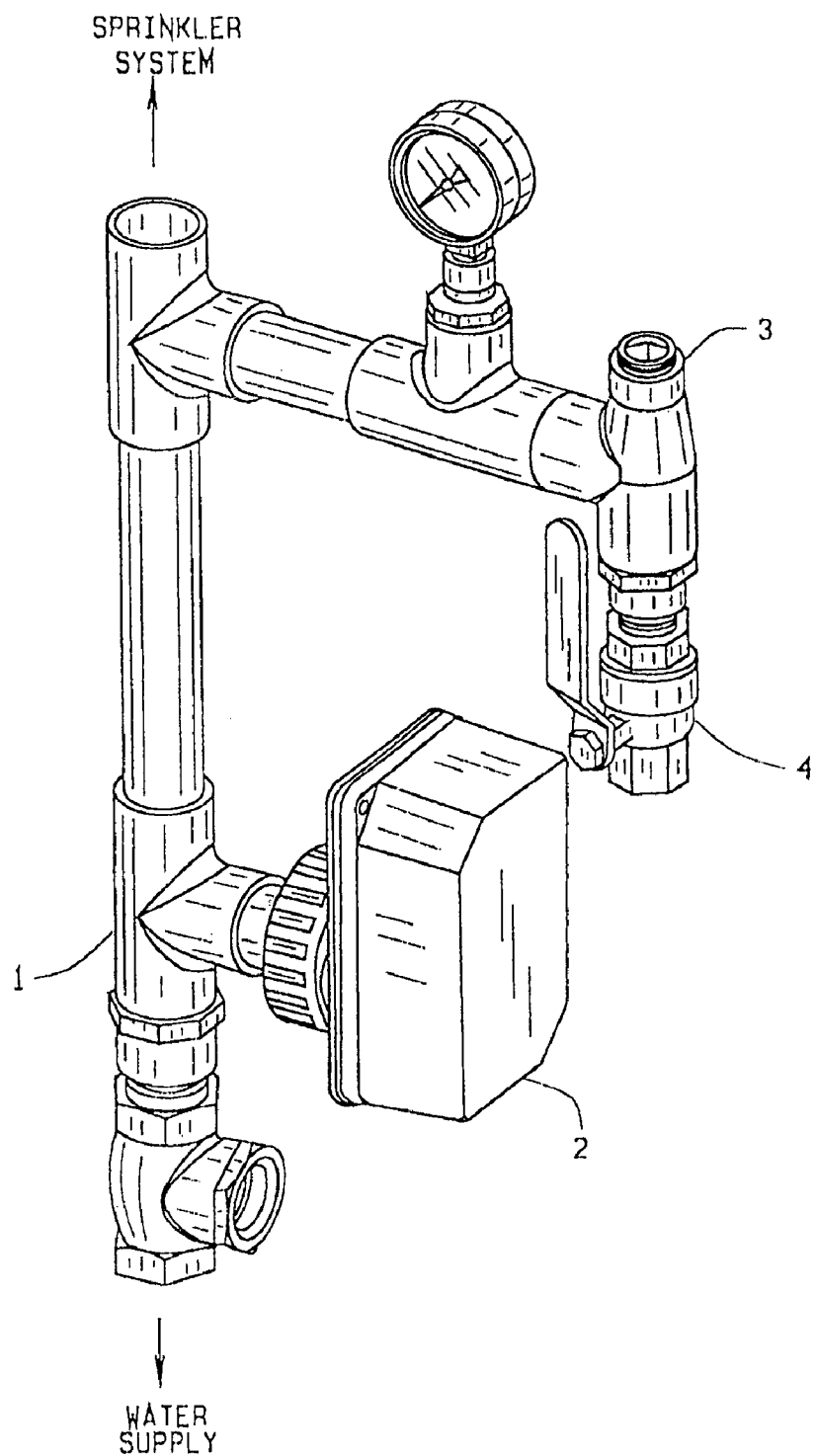
FIG. 1 is a side view of a prior art multi-piece manifold assembly for a sprinkler system.

Referring to the drawings, the preferred embodiment of the single-piece manifold according to the present invention is illustrated and generally indicated as 10 in FIGS. 2-5. Manifold 10 comprises a body 12 having a main housing 14 attached to a rear housing 16 with a main conduit 18 formed therethrough adapted for fluid flow.

Figure 2:
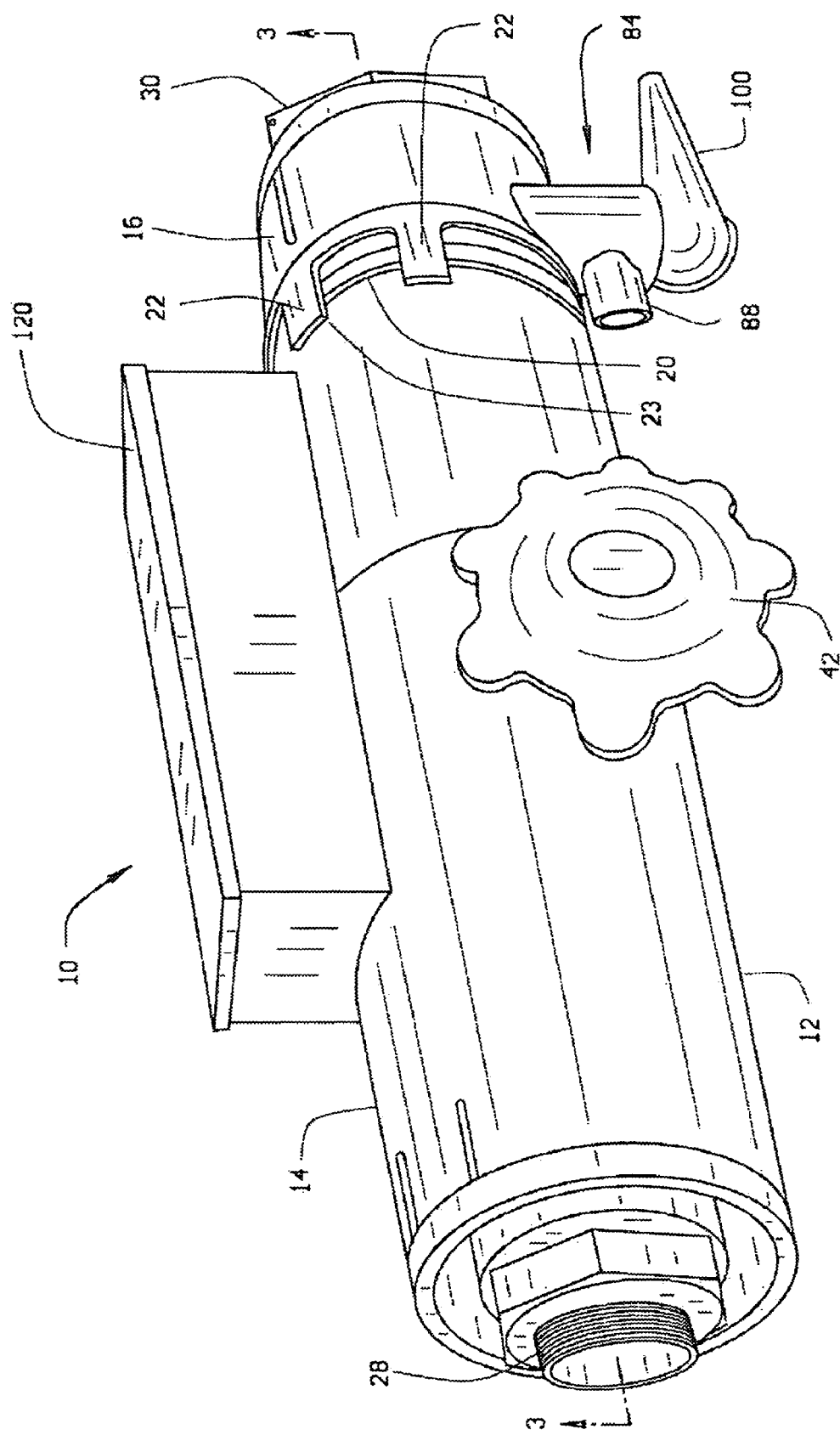
FIG. 2 is a perspective view of the single-piece manifold according to the present invention.
Figure 3:
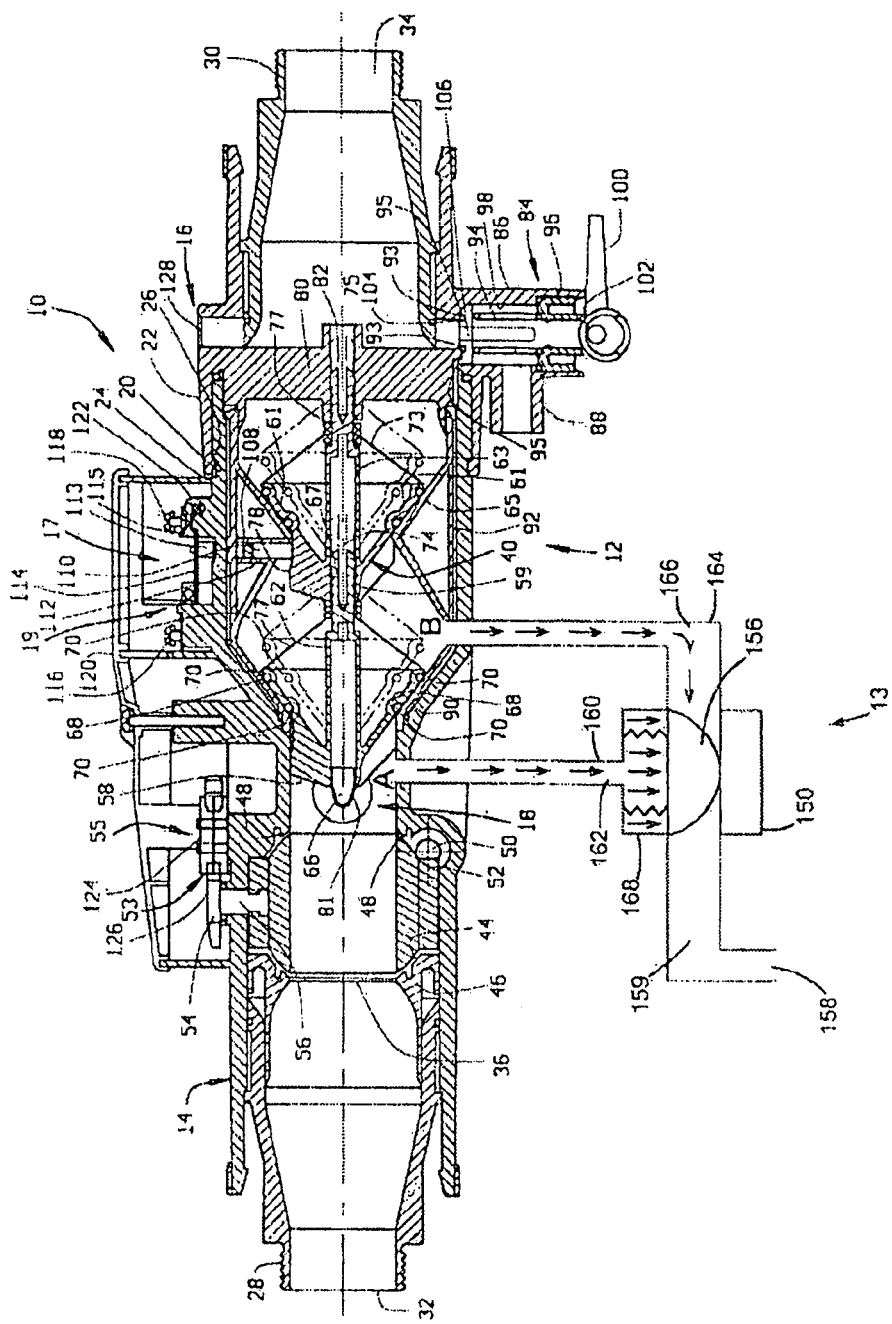
FIG. 3 is a cross sectional view of the single-piece manifold taken along line 3-3 of FIG. 2 illustrating the reduced pressure arrangement according to the present invention.

As shown in FIGS. 2, 3 and 4, main housing 14 defines a rear flange 20 which is adapted to engage a clamp member 21 secured to rear housing 16 by a threaded bolt 123. Clamp member 21 comprises a plurality of resilient fingers 22, each having sloped surface 24 and a detent 26 formed along the free end thereof. During assembly of main housing 14 to rear housing 16, fingers 22 engage and expand outwardly as each sloped surface 24 is forced over rear flange 20. When detent 26 passes fully over rear flange 20, fingers 22 relax as each respective detent 26 becomes fully engaged with flange 20, thereby securely attaching main housing 14 to rear housing 16.

As further shown, body 12 comprises a pair of end fittings 28 and 30 which are received in main housing 14 and rear housing 16, respectively, to define an inlet 32 and an outlet 34 at opposed ends of main conduit 18 which permits fluid flow through manifold 10. End fittings 28 and 30 are both externally threaded to allow for connection of manifold 10 to a water supply line (not shown) at inlet 32 and sprinkler system (not shown) at outlet 34 using methods well known in the art.

To shut off fluid flow through main conduit 18 during periods of maintenance and inspection, a main valve 36 is provided which is disposed across main conduit 18 proximate the inlet 32 which operates to prevent or allow fluid flow through manifold 10. Preferably, main valve 36 is a fixed ball valve positioned adjacent inlet 32 and mounted across main conduit 18, although any suitable valve arrangement which controls fluid flow is felt to fall within the scope of the present invention. Main valve 36 can be rotated between an open position which permits fluid flow into main conduit 18 and a closed position which precludes any fluid flow from entering main conduit 18 by a handle 42 being rotated by the user. Referring to FIG. 3, handle 42 is mounted on a shaft 50 which manually operates main valve 36 between the closed and open positions. Shaft 50 has worm gears 52 that mesh with the gears (not shown) of main valve 36 for actuating main valve 36. In assembly, main valve 36 securely abuts against an arcuate surface 44 of main housing 14 by a compression nut 46. A pair of ball seals 48 are positioned around main valve 36 for providing a fluid tight seal between main valve 36, compression nut 46, and arcuate surface 44.

To prevent inadvertent flow or backflow of fluid through main conduit 18 as well as prevent the sounding of false alarms, a check valve arrangement comprising first and second check valves 38 and 40 are spaced apart in series across main conduit 18 is provided. As further shown, a pressure zone A is defined between inlet 32 and first check valve 38 when seated, while a second pressure zone B is defined between the first and second check valves 38 and 40 when seated. Preferably, first and second check valves 38 and 40 are substantially identical spring-loaded axially actuated valves positioned behind main valve 36 along main conduit 18. First check valve 38 comprises a valve body 58 which is engageable with first valve seat 64, guide arms 60 which extend rearwardly from body 58, and a hollow tubular member 62 that extends axially from valve body 58 having a spherical shaped rear portion 74 formed at the free end thereof. Valve body 58 defines a hollow nose 66 which communicates with tubular member 62. As further shown, nose 66 of first check valve 38 has a bullet shaped piece 81 which is received therein to seal nose 66. The shape of nose piece 81 prevents fluid flow through main conduit 18 from becoming too turbulent. Preferably, nose piece 81 extends beyond the end of nose 66 of check valve 38. A pair of grooves 68 are formed along valve body 58 which are sized and shaped to receive sealing elements, preferably O-rings 70, to provide a fluid tight seal when first check valve 38 is placed in the closed position against first valve seat 64. To bias valve body 58 in the closed position, a first spring 76 is provided along tubular member 62 which applies a spring force against valve body 58 along the longitudinal axis of the first check valve 38 such that valve body 58 is securely seated against first valve seat 64 despite the pressure head applied by the water supply source. To provide further structural integrity to first check valve 38, spider arms 72 are provided which extend diagonally from the free end of guide arms 60 to tubular member 62.

Similarly, second check valve 40 comprises a valve body 59 defining a cam surface 78, guide arms 61, and a hollow nose 67 which communicates with a hollow tubular member 63. Tubular member 63 extends axially from valve body 59 having a rear portion 75 formed at the free end thereof. A second check valve seat 65 is sized and shaped to engage valve body 59 in fluid tight engagement thereto when second check valve 40 is placed in the closed position. A plurality of spider arms 73 also extend diagonally from the free end of each guide arm 61 to tubular member 63. Rear housing 16 includes a plurality of spaced apart support vanes 80 which define a cylindrical guide tube 82 in the center of conduit 18. The rear portion 75 of second check valve 40 is slidably received through guide tube 82 when second check valve 40 is placed in the open position. To bias and maintain the second check valve 40 in the closed position, a second spring 77 is provided around tubular member 63 adjacent guide tube 82 that applies a spring force sufficient to prevent inadvertent flow of water into the sprinkler system.

Referring specifically to FIG. 3, the operation of the first and second check valves 38 and 40 shall be discussed in greater detail. When properly assembled, the rear portion 74 of first check valve 38 is slidably received within the hollow nose 67 and tubular member 63 of second check valve 40. In the closed position, valve body 58 is seated in fluid tight engagement against first valve seat 64 such that fluid flow is prevented through main conduit 18. When the sprinkler system is activated, the force of fluid flow through main conduit 18 from the supply of water overcomes the spring force applied by the first spring 76 such that valve body 58 becomes unseated (shown in phantom) from first valve seat 64. Once unseated, fluid flow through first valve seat 64 begins to contact and unseat valve body 59 of second check valve 40.

When the pressure applied by fluid flow against valve body 59 overcomes the spring force applied by second spring 77, second check valve 40 (shown in phantom) becomes unseated from second valve seat 65 and permits fluid flow through outlet 34. One of ordinary skill in the art can appreciate that once the pressure applied by fluid flow through main conduit 18 begins to dissipate first and second check valves 38, 40 are biased back by their respective springs 76, 77 as the spring force overcomes fluid pressure. Once biased back, valve bodies 58, 60 reseat in fluid tight engagement against respective valve seats 64, 65, thereby placing first and second check valves 38, 40 in the closed position and prevent the backflow of water from the sprinkler system to the water supply source. Preferably, the pressure generated from the water supply must be at least 175 psi to overcome the spring force applied by first and second springs 76, 77 and place first and second check valves 38, 40 in the open position; however, the present invention contemplates that the necessary pressure may also fall below 175 psi.

Referring back to FIGS. 2 and 3, manifold 10 further includes a combination pressure relief and test valve 84 located behind and adjacent to support vanes 80 for providing a sample of liquid from main conduit 18 when so desired by the user or drain the manifold of water during maintenance. Combination valve 84 comprises a tube 86 which communicates with an outlet 88 that functions as a drain and a vent passageway 92 which communicates with outlet 88 and provides a means for venting excess pressure generated inside pressure zone A and prevent false alarms. As further shown, combination valve 84 includes a spring actuated piston 94 which is slidably received within tube 86 and is retained therein by a retainer 96 that receives one end of piston 94 along a sleeve 98. As illustrated, piston 94 defines a piston tip 106 having a seal which seats against a valve seat 104 in fluid tight engagement to close off fluid flow therethrough. To maintain a fluid tight seal when combination valve 84 is in the closed position, a groove 93 is formed around valve seat 106 for receiving an O-ring 95. Piston 94 is operatively connected to a lever 100 that includes a cam surface 102 that seats and unseats piston tip 106 from valve seat 104 whenever lever 100 is actuated by the user.

As further shown, vent passageway 92 adjacent the first check valve 38 defines an opening 90, while the other end of passageway 92 communicates with the atmosphere through an outlet 88 formed adjacent combination valve 84. When an excess pressure condition, such as a pressure surge from the water supply occurs, the excess pressure is bled through opening 90 of vent passageway 92 in order to prevent false alarms caused by pressure surges in the water supply when the main valve 36 is open which may potentially open both first and second check valves 38, 40.

According to another aspect of the present invention shown in FIGS. 3 and 8, manifold 10 further includes a reduced pressure arrangement comprising a valve member 13 that prevents the back flow of water that may build up in the area between the first and second check valves 38 and 40 after the sprinkler system has been activated. Valve member 13 comprises a housing 150 in communication with a hollow tubular member 160 that defines a first conduit 162 and a hollow tubular member 164 that defines a second conduit 166. As shown, first conduit 162 communicates with a pressure zone A defined between the inlet 32 and first check valve 38 while second conduit 166 communicates with a pressure zone B defined between the first and second check valves 38 and 40 of manifold 10. The housing 150 further comprises an outlet 158 in selective fluid flow communication with second conduit 166 through a conduit 159 defined by housing 150. A resilient diaphragm 156 operable between a normally-closed position and an open position is provided for selective fluid flow communication through conduit 159. A spring means 168, comprising one or more springs, is operatively engaged to the resilient diaphragm 156 such that the spring means 168 applies a bias that places the diaphragm 156 in a normally closed position that prevents fluid flow communication through conduit 159. In the normally closed position the resilient diaphragm 156 blocks conduit 159 such that fluid flow is prevented between second conduit 166 and outlet 158, while in the open position (FIG. 8a) the pressure applied by pressure zone B overcomes the combination of the spring force and pressure applied by pressure zone. The present invention contemplates that the diaphragm 156 may have sufficient resilience and be configured in any suitable manner that permits an operation that prevents or permits fluid flow communication in response to a difference in pressure differential between pressure zones A and B.

Because the sealing elements of second check valve 40 may have degraded over time water from the activated sprinkler system may build up and become trapped in the area between the first and second check valves 38 and 40. In certain circumstances, sufficient build up of water trapped between the first and second check valves 38 and 40 may generate a sufficient pressure head that could cause the first check valve 38 to fail and permit contaminated water to enter the water supply. The valve member 13 of the present invention provides a means for preventing sufficient build up of trapped water by venting the trapped water when the pressure in pressure zone B exceeds the pressure in pressure zone A by a predetermined value.

In operation, the resilient diaphragm 156 of valve member 13 is in the normally-closed position (shown in phantom) when the combination of the pressure in pressure zone A and the spring force applied by spring means 168 to the resilient diaphragm 156 is greater than the pressure in pressure zone B. However, when the pressure in pressure zone B increases due to the build up of trapped water between the first and second check valves 38 and 40 which exceeds the combination of the pressure in pressure zone A and the spring force applied by spring 168 against resilient diaphragm 156, diaphragm 156 is forced to the open position by the pressure head generated by the trapped water that permits fluid flow communication between outlet 158 and second conduit 166, thereby venting the trapped water from the space in pressure zone B. Preferably, spring means 168 is at least one spring 168 operatively engaged to resilient diaphragm 156 wherein the spring force applied to diaphragm 156 determines the pressure differential required between pressure zone A and pressure zone B that must be overcome in order to force the resilient diaphragm 156 in the open position. Accordingly, the pressure differential may be adjusted by using spring means 168 having different spring forces.

Another aspect of the present invention is to provide a flow switch arrangement 17 which provides a means for sounding an alarm when the sprinkler system is activated and fluid flow is established through both first and second check valves 38, 40. As shown in FIGS. 3 and 4, flow switch arrangement 17 comprises a sleeve 108 positioned directly above second check valve 40 having a plunger 110 slidably received therein. As further shown in FIG. 6, flow switch arrangement 17 comprises a flow switch 19 having a magnet 113 attached to a conductive moving switch blade 114 which is connected to positive terminal 116, while a conductive stationary switch blade 115 is connected to a negative terminal 118.

As noted above, valve body 69 of second check valve 40 further defines a cam surface 78 adapted to engage plunger 110. When water flows through main conduit 18 during activation of the sprinkler system and causes second check valve 40 to unseat and move axially away from second valve seat 65, sloped surface 78 rides under plunger 110 such that plunger 110 is forced progressively upward through sleeve 108. As plunger 110 moves upward magnet 112 comes into close proximity with magnet 113 of flow switch 19. The proximity of the two magnets 112, 113 causes a contact point 122 as moving switch blade 114 comes into contact with stationary switch blade 115. The contact point 122 completes an electrical circuit between positive and negative terminals 116, 118 that signals an alarm at a remote panel (not shown) that indicates the sprinkler system has been activated. As further shown, flow switch 19 is encased in a protective housing 120 located on top of main housing 14 which also houses a tamper switch arrangement 53.

Referring to FIG. 3, the operation of the tamper switch arrangement 53 will be discussed in greater detail. Tamper switch arrangement 53 comprises a tamper switch 55 for signaling an alarm and a cam arm 54 which is operatively connected to main valve 36 by means of a shaft 56 which simultaneously rotates cam arm 54 whenever main valve 36 is actuated. Cam arm 54 operates to open and close tamper switch 55 which sounds an alarm when the main valve 36 is closed. When cam arm 54 is placed in a closed position by the actuation of main valve 36, cam arm 54 is brought into contact with a switch button 124 of tamper switch 55 which energizes tamper switch arrangement 53 and signals an alarm. Conversely, when main valve 36 is placed in the open position, cam arm 54 is brought out of contact with switch button 124 which de-energizes tamper switch 55 and terminates the alarm.

Another aspect of the present invention is to provide a manifold 10 having the capability of directly measuring fluid pressure inside main conduit 18. As shown in FIG. 3, rear housing 16 defines an outlet 128 which directly communicates with main conduit 18 and is sized and adapted to receive a conventional pressure gauge (not shown) therein for measuring fluid pressure.

Figure 7:
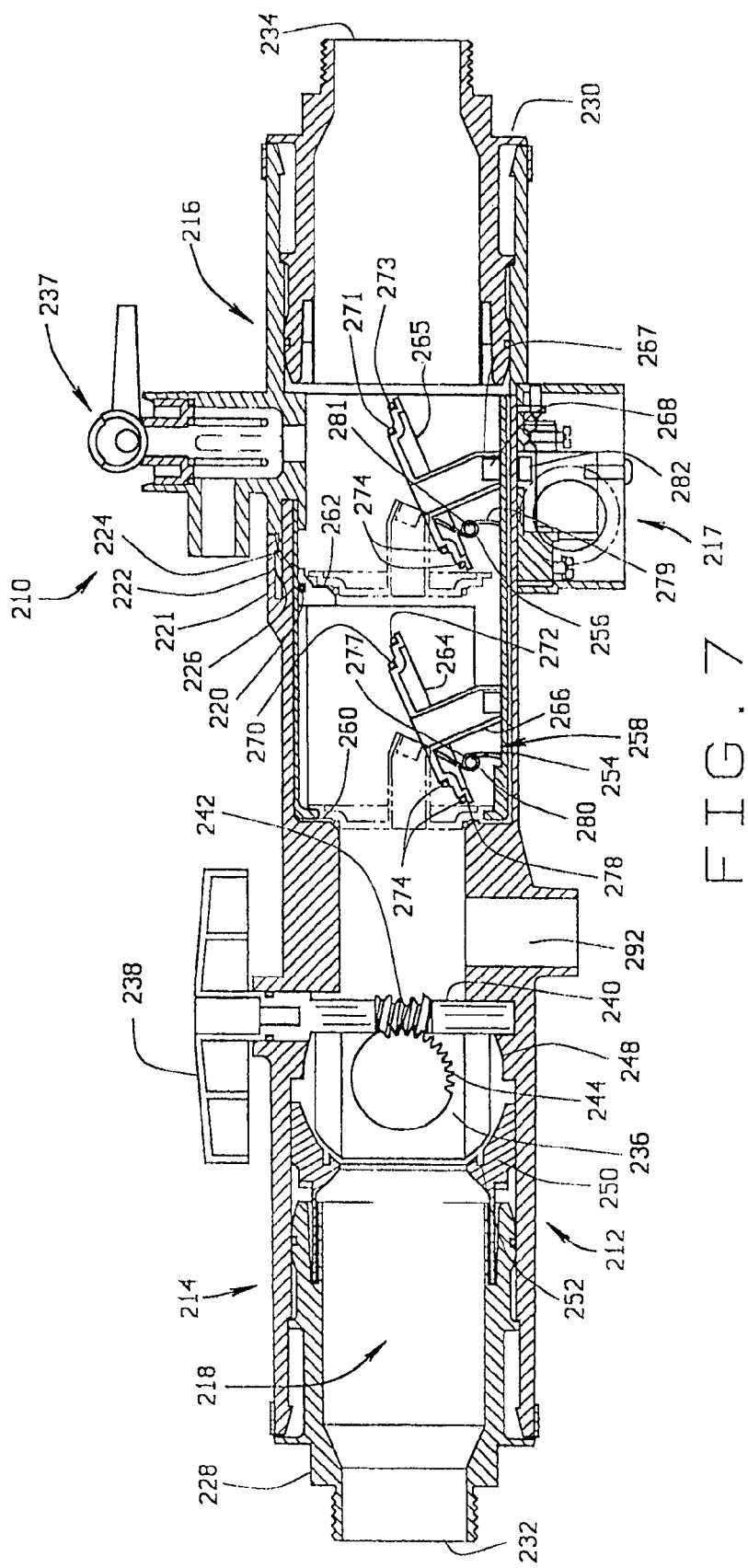
FIG. 7 is a cross sectional view of an alternative embodiment of the present invention.

Referring to FIG. 7, the present invention contemplates an alternative embodiment single-piece manifold 210 which comprises a body 212 having a main housing 214 and a rear housing 216 with a conduit 218 formed therethrough adapted for fluid flow. A clamp member 221 is provided having a plurality of resilient fingers 222 with each finger 222 defining a sloped surface 224 and a detent 226 at the flee end thereof, while rear housing forms a flange 220 adapted to engage clamp member 221. During assembly of main housing 214 to rear housing 216, fingers 222 expand as each respective sloped surface 224 is forced over rear flange 220. When the detent 226 of each finger 222 fully passes over rear flange 220, fingers 222 relax as detents fully engage with rear flange 220, thereby securely attaching main housing 214 to rear housing 216. To attach the single-piece manifold 210 with the sprinkler system and the water supply, body 212 is also provided with a pair of end fittings 228 and 230 which are received in main housing 214 and rear housing 216, respectively, to define an inlet 232 and an outlet 234 at opposed ends of main conduit 218 which permit fluids to flow through manifold 210.

As with the preferred embodiment, single-piece manifold 210 is also provided with a main valve 236 which prevents or allows fluid flow through main conduit 218. Preferably, main valve 236 is a fixed ball valve positioned adjacent inlet 232 and mounted across conduit 218. Similar to the preferred embodiment, main valve 236 can be rotated by the user using a handle 238 between a open position which permits fluid flow through main conduit 218 and a closed position which precludes any fluid flow through main conduit 218. Handle 238 is mounted on a shaft 240 which manually operates main valve 236 between closed and open positions. Shaft 240 has worm gears 242 that mesh with gears 244 of main valve 236 for actuating main valve 236. As further shown, main valve 236 further comprises a tamper switch arrangement (not shown) which operates in substantially the same manner as the preferred embodiment. Main valve 236 is positioned to abut against an arcuate surface 248 of main housing 214 by a compression nut 250. A pair of ball seals 252 are positioned around main valve 236 for providing a fluid tight seal between main valve 236, compression nut 250, and arcuate surface 248.

As distinguished from the axially actuated check valves 38 and 40 of the preferred embodiment, manifold 210 comprises substantially identical spring-loaded, pivotally mounted first and second flapper check valves 254 and 256 that checks the flow of water until the sprinkler system is activated and prevents reflux of water back through main conduit 218 once fluid flow is initiated. A valve seat assembly 258 is disposed along a portion of main conduit 218 and defines first and second valve seats 260, 262 which are sized and shaped to establish a fluid tight seal against first and second check valves 254, 256, respectively, when valves 254, 256 are in the closed position.

First check valve 254 has a valve body 264 adapted to seat against first valve seat 260 and defines an axial extension 266 extending from the body 264. Valve body 264 is pivotally mounted to body 212 at a pivot point 280 by a rod 277 inserted therethrough such that first check valve 254 rotates about pivot point 280 when first check valve 254 is biased in either the closed or open positions. To bias valve body 264 in the closed position, a torsion spring 278 is provided about pivot point 280 which applies a spring force against first check valve 254 such that valve body 264 is securely seated against first valve seat 260 in fluid tight engagement thereto, as shown in phantom. To provide this fluid tight seal, valve body 264 further defines a pair of grooves 270, 272 having O-rings 274 of different diameters which establish a fluid tight seal against first valve seat 260. By using O-rings 274 of different diameters, the sprinkler system side of the first check valve 254 will seat the valve body 264 against the inlet pressure caused by the head pressure generated by the water supply.

Figure 7A:
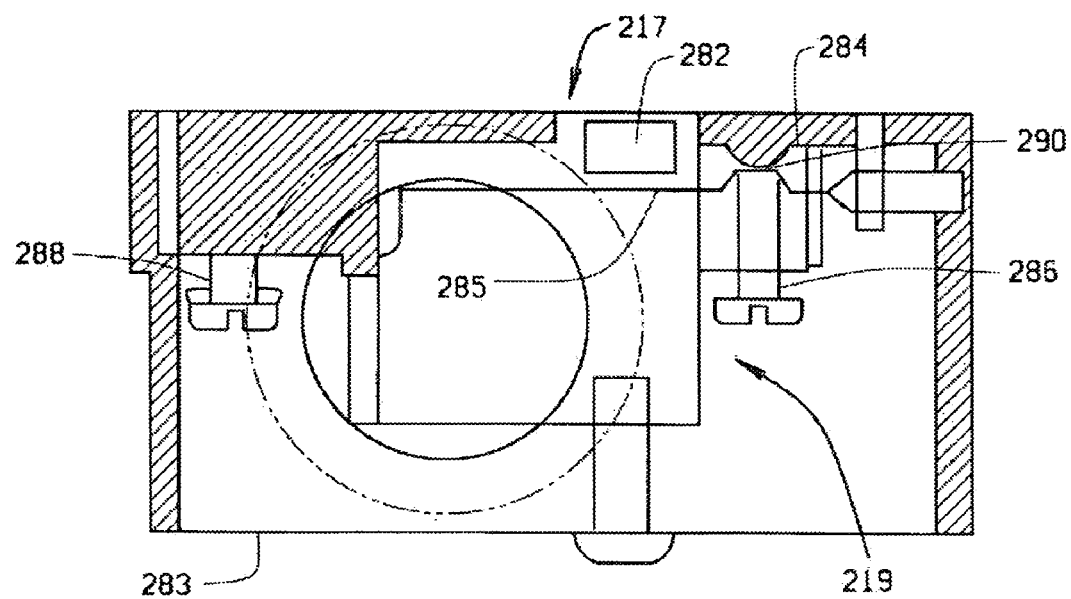
FIG. 7a is an enlarged cross sectional view of the flow switch arrangement shown in FIG. 7 according to the present invention.

Similarly, second check valve 256 comprises a valve body 265 adapted to seat against a second valve seat 262 and defines an axial extension 267 extending from body 265. As in the preferred embodiment, manifold 210 also comprises a flow switch arrangement 217 for sounding an alarm when the sprinkler system is activated and fluid flow is initiated. Referring to FIGS. 7 and 7a, to sound the alarm the axial extension 267 has a magnet 268 disposed at the free end thereof for actuating flow switch arrangement 217 as shall be discussed in greater detail below. Valve body 265 is also pivotally mounted to body 212 at a pivot point 281 such that second check valve 256 rotates about pivot point 281 when check valve 254 is biased in either the closed or open positions by a torsion spring 279 in a manner similar to first check valve 254. To provide this fluid tight seal, valve body 265 defines a pair of grooves 271, 273 having substantially similar O-rings 274 of different diameters which establish a fluid tight seal against second valve seat 262 when second flapper check valve 256 is in the closed position.

The operation of first and second flapper check valves 254, 256 shall now be discussed. In the closed position, valve body 264 of first flapper check valve 254 is biased in fluid tight engagement with first valve seat 260 which checks the flow of water through main conduit 210 until the sprinkler system is activated as well as prevent the reflux of fluid back through main conduit 218 once fluid flow is initiated through manifold 210. When the main valve 236 is placed in the open position and sprinkler system is activated, the force of water flow through main conduit 218 from the water supply against first flapper check valve 254 overcomes the spring force applied by torsion spring 278 such that valve body 264 (shown in phantom) becomes unseated as valve 254 swings away from first valve seat 260. Once first valve check valve 254 becomes unseated the pressure of fluid flow applied against valve body 265 of the second check valve 256 overcomes the torsion spring force of spring 279 to unseat valve body 265 and permit fluid flow through outlet 234.

One of ordinary skill in the art can appreciate that when the pressure applied by fluid flow through conduit 218 begins to dissipate first and second flapper check valves are biased back by their respective torsion springs 278, 279 as the spring force of each spring 278, 279 overcomes the dissipating fluid pressure. Once biased back, valve bodies 264, 265 reseat against respective first and second valve seats 260, 262 and place first and second check valves 254, 256 in the closed position that prevents the back flow of water into the water supply.

Referring to FIG. 7a, flow switch arrangement 217 provides a means for transmitting a signal and sounding an alarm when the sprinkler system is activated and fluid flow is initiated through main conduit 218. Flow switch arrangement 217 comprises a flow switch 219 encased in a protective housing 283 which includes a magnet 282 attached to a moving conductive switch blade 284 connected to a negative terminal 288. As shown, flow switch 219 further comprises a stationary conductive switch blade 285 fixedly attached to the wall of housing 283 which is connected to a positive terminal 286. As noted above, when valve body 265 is rotated away from second valve seat 262, magnet 268 comes into close proximity with magnet 282 of flow switch 219. The proximity of the two magnets 268, 282 causes a contact point 290 as moving switch blade 284 comes into contact with stationary switch blade 285. The contact point 290 completes an electrical circuit between positive and negative terminals 286, 288. One of ordinary skill in the art can appreciate that the flow switch arrangement 217 may be configured such that magnets 268, 282 either repel or attract one another in order to establish contact point 290 such that flow switch 219 is energized and the alarm activated.

Similarly, another aspect of the alternative embodiment is that main valve 236 has a provision for a tamper switch arrangement(not shown) which operates in substantially the same manner as tamper switch arrangement 17 of the preferred embodiment. Referring back to FIG. 7, single-piece manifold 210 is also provided with the capability of measuring fluid pressure inside conduit 218 through use of an outlet 292 which is adapted to receive a conventional pressure gauge (not shown). Preferably, single-piece manifold 210 also comprises a test valve 237 which is configured and operates in substantially the same manner as the preferred embodiment for providing a sample of liquid from conduit 218.

According to another aspect of the present invention, the single-piece manifold 210 may also incorporate valve member 13 in the same manner noted above for the preferred embodiment of the single-piece manifold 10. As such, a pressure zone A is defined between the inlet 232 and the first check valve 254, while a pressure zone B is defined between the first check valve 254 and the second check valve 256. Although not shown, the valve member 13 communicates with pressure zones A and B in the same manner as the preferred embodiment such that when the pressure differential between pressure zone A and pressure zone B exceeds a predetermined value water built up in the area between the first and second check valves 254 and 256 is allowed to be vented through valve member 13 in order to prevent the back flow of water into the water supply.

Although the present invention discloses a manifold to be used with a sprinkler system, it would be apparent to those skilled in the art that the single-piece manifold could be used with a water supply containing anti-freeze or other liquid, or it could even be used in a dry system, such as an air pressure line.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A single-piece manifold for a fire sprinkler system comprising:

a body defining a main conduit therethrough in communication with an inlet for connecting the single-piece manifold to a supply of water and an outlet for connecting the single-piece manifold to the fire sprinkler system, a first check valve and a second check valve within said main conduit for preventing or permitting fluid flow communication through said main conduit, a first pressure zone defined between said inlet and said first check valve and a second pressure zone defined between said first check valve and said second check valve, and a valve member in communication with said first pressure zone and said second pressure zone for preventing water from said second pressure zone from flowing back into said first pressure zone said valve member including:
- a first conduit in fluid flow communication with said first pressure zone;
- a second conduit in fluid flow communication with said second pressure zone and an outlet;
- a diaphragm which in a closed position prevents fluid flow communication in said second conduit at a point between said second pressure zone and said outlet; and
- a spring having a spring force, said spring biasing said diaphragm in said closed position;
- wherein, if pressure in said second pressure zone is greater than the combination of pressure in said first pressure zone and said spring force, said diaphragm is moved to an open position.

2. The single-piece manifold of claim 1, further including a vent passageway in fluid flow communication with said main conduit.

3. The single-piece manifold of claim 1, wherein said first and second check valves being pivotable between a closed position wherein fluid flow is prevented and an open position wherein fluid flow is permitted.

4. The single-piece manifold of claim 1, further comprising a main valve in said main conduit movable between an open position in which water may enter said body and a closed position in which water is prevented from passing through said body.

5. The single-piece manifold of claim 1, further including a fire alarm means responsive to the movement of said second check valve and a means for preventing the sounding of a false alarm.

6. The single-piece manifold of claim 5, wherein said false alarm means includes a flow switch arrangement which sounds a false alarm when activated, a plunger which is slidably received in a sleeve to be moved into and out of close proximity with said flow switch arrangement to activate said flow switch arrangement by a cam surface of said second check valve, wherein when said second check valve is moved to an open position, said cam surface forces said plunger into contact with said flow switch arrangement to sound said fire alarm.

* * * * *